United States Patent
Misra et al.

[11] Patent Number: 5,664,823
[45] Date of Patent: Sep. 9, 1997

[54] INSTRUMENT PANEL BRACE

[75] Inventors: Sudipta K. Misra; Mike J. Leigh, both of Farmington Hills; Joseph B. Hurley, Dearborn, all of Mich.

[73] Assignee: Ford Global Technologies, Inc., Dearborn, Mich.

[21] Appl. No.: 529,817

[22] Filed: Sep. 18, 1995

[51] Int. Cl.$^6$ .................................................. B60K 20/08
[52] U.S. Cl. ........................... 296/70; 296/188; 296/194; 280/777; 180/90
[58] Field of Search ..................... 296/188, 189, 296/70, 194; 280/777, 779; 180/90; 74/492

[56] References Cited

U.S. PATENT DOCUMENTS

| | | |
|---|---|---|
| 3,502,346 | 3/1970 | Cadiou . |
| 4,362,331 | 12/1982 | Harasaki et al. ........................ 296/194 |
| 4,826,234 | 5/1989 | Komatsu .................................. 296/70 |
| 5,052,240 | 10/1991 | Miyoshi et al. . |
| 5,085,467 | 2/1992 | Converse . |
| 5,181,435 | 1/1993 | Khalifa et al. . |
| 5,238,286 | 8/1993 | Tanaka et al. . |
| 5,356,179 | 10/1994 | Hildebrandt et al. . |
| 5,387,023 | 2/1995 | Deneau ................................ 296/194 X |
| 5,564,769 | 10/1996 | Deneau et al. ....................... 296/189 X |

FOREIGN PATENT DOCUMENTS 405286458  11/1993  Japan ......................................... 296/70

*Primary Examiner*—Joseph D. Pape
*Attorney, Agent, or Firm*—Neil P. Ferraro

[57] ABSTRACT

An instrument panel brace for aiding in the alignment of the steering column of a vehicle during a collision. The brace is attached to the instrument panel beam which in turn is attached to the steering column. Further, the instrument panel brace lies adjacent the cowl rather than being rigidly attached to either the cowl or dash panel. During a collision, the brace resists rotation of the steering column caused when the driver's knees push up against the instrument panel beam while resisting transferring load from the engine to the steering column.

15 Claims, 1 Drawing Sheet

INSTRUMENT PANEL BRACE

FIELD OF THE INVENTION

The present invention relates to a vehicle instrument panel brace for reducing instrument panel beam rotation during a vehicle collision without providing a direct load path from the engine to the steering column.

BACKGROUND OF THE INVENTION

The instrument panel brace, which extends between the cowl and the instrument panel beam, is an important component of the instrument panel structure in vehicle where the occupant is not wearing a seat belt, but where the vehicle is equipped with an air bag restraint.

Previous versions of these braces allow a direct load path from the engine to the steering column which may cause the steering column to move rearwardly toward the driver during a collision. If the vehicle's instrument panel beam is not stiff enough so that it rotates during a collision, the result is reduced air bag efficiency because the air bag may not be positioned directly in front of the driver. To overcome this, an instrument panel brace is provided to hold the beam, steering column and air bag in position during a collision. However, if the instrument panel brace is not positioned properly, it could provide a direct load path from the engine to the steering column. The engine could push the dash, the instrument panel brace and the steering column rearwardly toward the driver.

U.S. Pat. Nos. 5,052,240 to Miyoshi et al. and 5,181,435 to Khalifa et al. teach the use of an instrument panel brace that is attached to the cowl. In this situation, the engine loading caused by a collision is directly transferred to the steering column. In the present invention, the instrument panel brace lies adjacent the cowl, without being attached thereto, and attaches to the instrument panel beam, thereby holding the steering column and air bag in place during a collision. However, because there is no attachment of the brace to the cowl or dash, the brace does not provide a direct load path from the engine to the steering column. Tests run on a vehicle showed an improvement of 14 g in a driver's dummy chest response when the instrument panel brace of the present invention was used.

SUMMARY OF THE INVENTION

Accordingly, an advantage of the invention is to provide a brace which reduces instrument panel beam rotation during a collision.

Another advantage of the invention is to provide a brace which resists direct loading of the steering column from the engine during a collision.

According to the invention, there is provided an instrument panel brace for a vehicle for resisting steering column rotation and direct engine loading of an instrument panel beam during a collision of the vehicle comprising an upper portion for positioning said brace adjacent a portion of a cowl of said vehicle without being attached to said cowl; a lower portion for attaching said brace to a portion of a instrument panel beam of said vehicle; and a mid portion disposed between said upper and lower portions.

According to the invention there is also provided an instrument panel structural arrangement for a vehicle comprising a cowl substantially extending the width of said vehicle; an instrument panel brace having an upper portion lying adjacent said cowl without being attached to said cowl, a lower portion, and a mid portion disposed therebetween; an instrument panel beam substantially extending the length of said vehicle and being attached to said lower portion of said instrument panel brace; and, a steering column attached to said instrument panel beam.

According to the invention there is also provided a method of resisting rotation of a steering column of a vehicle during a collision while resisting engine loading from being transmitted to said steering column comprising the steps of positioning an upper portion of an instrument panel brace adjacent a cowl of said vehicle without attaching said brace to said cowl; fastening a lower portion of said instrument panel brace to an instrument panel beam; and attaching said instrument panel beam to said steering column.

Other objects, features and advantages of the present invention will be readily appreciated as the same becomes better understood after reading the subsequent description taken in connection with the accompanying drawings.

BRIEF DESCRIPTION OF THE DRAWINGS

The invention will now be described, by of example, with reference to the accompanying drawings, in which.

DETAILED DESCRIPTION OF THE PREFERRED EMBODIMENTS

Figure 1:
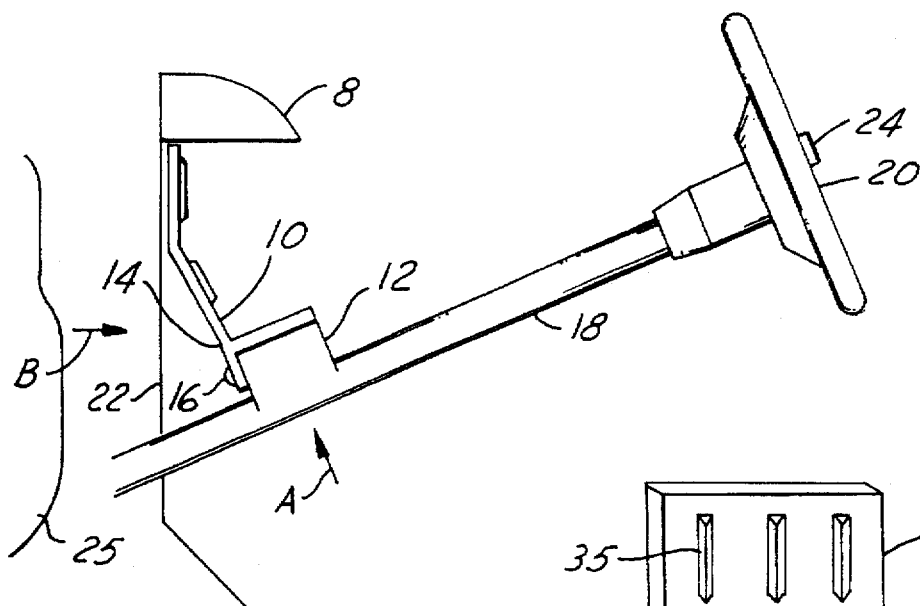
FIG. 1 a diagrammatic plan view of the present invention showing the instrument panel support structure.

Turning first to FIG. 1, there is shown a structural arrangement for supporting a steering column according to the present invention, together with part of the body of a vehicle to which the instrument panel brace is applied. Cowl 8 extends in the direction of the width of the body of the vehicle. Instrument panel brace 10 lies adjacent, but not attached, to cowl 8 and is disposed between cowl 8 and instrument panel beam 12. Instrument panel beam 12 also extends the width of the body of the vehicle. Instrument panel brace 10 is mounted such that it abuts cowl 8 at one end thereof and is fixed to instrument panel beam 12 by, for example, flange 14 extending from instrument panel brace 10 and fastened to instrument panel beam 12 by fastening means 16. Instrument panel beam 12 in turn supports steering column 18 on which is mounted steering wheel 20 and air bag 24. Steering wheel column 18 passes through dash panel 22 to actuate the steering mechanism (not shown). It should be noted that instrument panel brace 10 does not support steering column 18. Rather instrument panel beam 12 supports steering column 18.

There are at least two distinct stages that occur during a vehicle collision. In the first stage, the driver's knees are forced up against instrument panel beam 12 at location designated "A" in FIG. 1. This typically causes steering column 18 to rotate counter clockwise as viewed in FIG. 1 which further causes instrument panel beam 12 to rotate counter clockwise. Thus, one purpose of instrument panel brace 10 is to allow air bag 24 to deploy at a proper orientation relative to the driver's upper body by helping steering column 18 maintain its original position. In the second stage of a collision, after air bag deployment, further deformation of the vehicle occurs in which engine 25 generally moves in the direction indicated by arrow "B". In prior art structures, because the instrument panel brace is attached directly to dash panel 22 or cowl 8, the instrument panel brace would move downwardly and rearwardly causing steering column 18 to move downwardly and rearwardly rendering the air bag less efficient. To resist this, instrument panel brace 10 of the present invention abuts against cowl 8 or may have minimal clearance, for example, 10 mm, rather than being attached to dash panel 22 or cowl 8. Thus, the primary purpose of instrument panel brace 10 is to aid in holding steering column 18 in place when the driver's knees are forced up against instrument panel beam 12, thereby aiding airbag 24 to deploy at a proper orientation relative to the driver's upper body.

Figure 2:
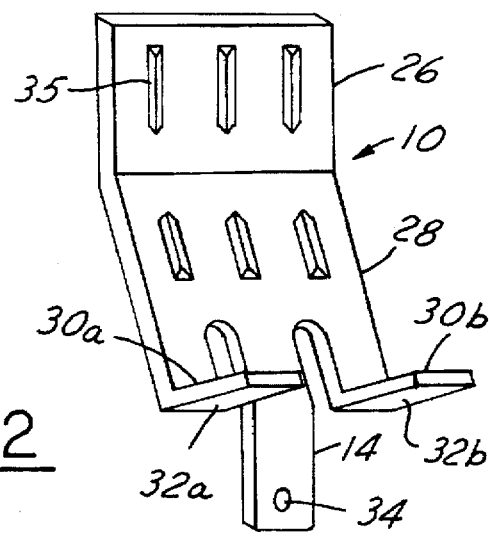
FIG. 2 is a diagrammatic perspective view of the instrument panel brace of the present invention.

Turning now to FIG. 2, there is shown the instrument panel brace 10 in perspective view. Instrument panel brace 10 has an upper portion 26, a mid portion 28 adjacent upper portion 26, and two lower portions 30a and 30b extending from mid portion 28 such that bottoms 32a and 32a of lower portions 30a and 30b rest adjacent instrument panel beam 12. Flange 14 extends from mid portion 28 and is generally perpendicular to lower portions 30a and 30b. Flange 14 also has hole 34 to accept fastening means 16 for attachment to instrument panel beam 12. Of course, as would be apparent to one of ordinary skill in the art in view of this disclosure, flange 14 need not have hole 34 but may be fastened to instrument panel beam 12 by any acceptable fastening means such as welding, brazing, riveting, and the like. Indeed, flange 14 need not be utilized at all to attach instrument panel brace 10 to instrument panel beam 12. For example, lower portions 30a and 30b may be used to attach instrument panel brace 10 to instrument panel beam 12. Further, instrument panel brace 10 may have a plurality of reinforcing ribs 35 spaced throughout. In a preferred embodiment, instrument panel brace 10 is designed such that the bending strength of brace 10 is not more than the strength of cowl 8. Thus, in the event that instrument panel brace 10 becomes subjected to direct engine loading, instrument panel brace 10 will deform before any other component in the instrument panel structure deforms.

Figure 3:
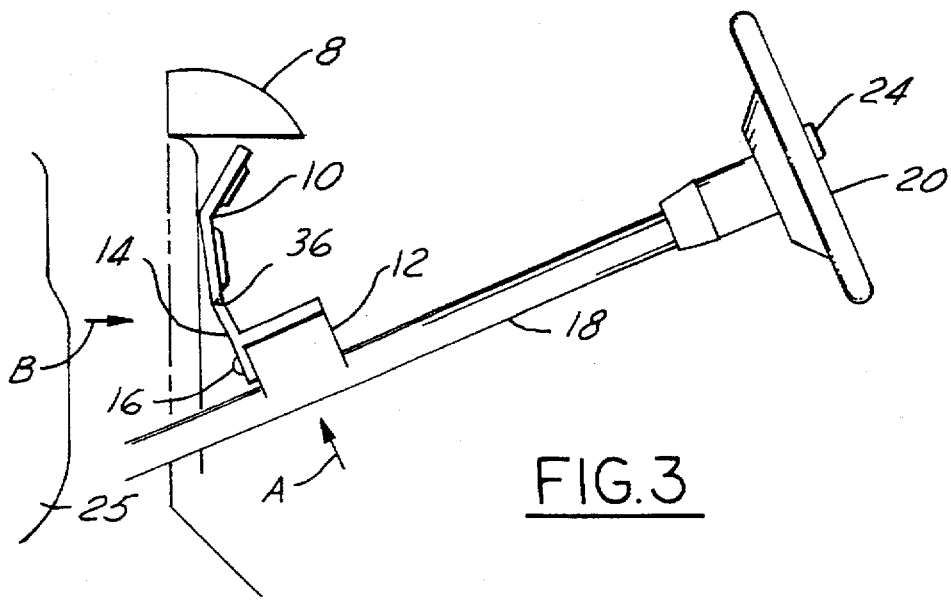
FIG. 3 is a diagrammatic plan view of the present invention showing the deformation of a dash without the resultant deformation of the steering column.

Referring now to FIG. 3, there is shown instrument panel brace 10 in a bent configuration following a vehicle collision. Dash panel 22 is pushed in a direction indicated by arrow "B" by engine 25 during the second stage of the collision. Because instrument panel brace 10 is not attached to cowl 8 or dash panel 22, no direct engine load to instrument panel brace 10 occurs. As shown in FIG. 3, should instrument panel brace 10 be subject to direct engine loading by the deformation of dash panel 22, instrument panel brace 10 will buckle or bend somewhere along the length thereof, for example, at about location 36 as shown due to the bending strength of instrument panel brace 10 not being greater than the strength of cowl 8. Thus, instrument panel brace 10, as disclosed herein, prevents rotation of instrument panel beam 12 while preventing direct engine loading to be transferred to steering column 18.

While the best mode in carrying out the invention has been described in detail, those having ordinary skill in the art to which this invention relates will recognize various alternative designs and embodiments, including those mentioned above, in practicing the invention that has been defined by the following claims.

I claim:

1. An instrument panel brace for a vehicle, with said vehicle having a cowl and an instrument panel beam both substantially extending the width of said vehicle, a steering column attached to said instrument panel beam, and an engine, with said instrument panel brace resisting steering column rotation and direct engine loading of said instrument panel beam during a collision of the vehicle, with said instrument panel brace comprising:

an upper portion for positioning said brace adjacent a portion of said cowl of said vehicle without being attached to said cowl;

a lower portion for attaching said brace to a portion of said instrument panel beam of said vehicle; and a mid portion disposed between said upper and lower portions.

2. The instrument panel brace of claim 1 wherein said brace has a strength not more than the strength of said cowl.

3. The instrument panel brace of claim 1 wherein said lower portion attaches to said instrument panel beam by fastening means.

4. The instrument panel brace of claim 1 wherein said brace has a plurality of reinforcing ribs.

5. The instrument panel brace of claim 1 wherein said lower portion has a flange extending therefrom for attaching said brace to said instrument panel beam.

6. An instrument panel structural arrangement for a vehicle comprising:

a cowl substantially extending the width of said vehicle;

an instrument panel brace having an upper portion lying adjacent said cowl without being attached to said cowl, a lower portion, and a mid portion disposed therebetween;

an instrument panel beam substantially extending the width of said vehicle and being attached to said lower portion of said instrument panel brace; and, a steering column attached to said instrument panel beam.

7. The instrument panel structural arrangement of claim 6 wherein said upper portion of said brace is spaced adjacent said cowl by a distance of less than about 10 mm.

8. The instrument panel structural arrangement of claim 6 wherein said instrument panel brace has a strength not more than the strength of said cowl.

9. The instrument panel structural arrangement of claim 6 wherein said lower portion of said brace is attached to said instrument panel beam by fastening means.

10. The instrument panel structural arrangement of claim 6 wherein said brace has a plurality of reinforcing ribs.

11. The instrument panel structural arrangement of claim 6 wherein said lower portion of said brace has a flange extending therefrom, said flange is attached to said instrument panel beam.

12. A method of resisting rotation of a steering column of a vehicle during a collision while resisting engine loading from being transmitted to said steering column, with said vehicle having a cowl and an instrument panel beam both substantially extending the width of said vehicle, with said steering column being attached to said instrument panel beam, with said method comprising the steps of:

positioning an upper portion of an instrument panel brace adjacent said cowl of said vehicle without attaching said brace to said cowl;

fastening a lower portion of said instrument panel brace to said instrument panel beam; and attaching said instrument panel beam to said steering column.

13. The method of claim 12 wherein said positioning step further comprises the step of spacing said upper portion of said brace a distance of about 10 mm away from said cowl.

14. The method of claim 12 further comprising the step of providing the instrument panel brace with a plurality of reinforcing ribs.

15. The method of claim 12 wherein said attaching step further comprises the step of providing said instrument panel brace with a flange extending from a lower portion thereof and attaching said flange to said instrument panel beam.

* * * * *